(12) United States Patent
Chu

(10) Patent No.: US 7,983,703 B2
(45) Date of Patent: Jul. 19, 2011

(54) PRIORITIZED COMMON SUBFRAME TO PROVIDE BETTER SERVICE TO THE OVERLAPPING AREAS IN A COMMUNITY

(75) Inventor: Liwen Chu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 704 days.

(21) Appl. No.: 12/035,268

(22) Filed: Feb. 21, 2008

(65) Prior Publication Data

US 2008/0207192 A1  Aug. 28, 2008

Related U.S. Application Data

(60) Provisional application No. 60/891,122, filed on Feb. 22, 2007.

(51) Int. Cl.
*H04Q 7/20* (2006.01)
(52) U.S. Cl. ........ 455/509; 455/511; 455/507; 455/512; 455/450; 455/426.1; 370/310; 370/328; 370/329; 370/343; 370/338
(58) Field of Classification Search .................. 455/509, 455/511, 507, 512, 500, 517, 450–452.2, 455/403, 422.1, 550.1, 445; 370/310, 328, 370/329, 343, 338
See application file for complete search history.

(56) References Cited

U.S. PATENT DOCUMENTS 6,496,498 B1 * 12/2002 Kockmann et al. ........... 370/347

OTHER PUBLICATIONS

Freedman, Avi, "Slave Hierarchy for Better Usage of Regions not Interfered by the Master Subframe", IEEE 802.16 Broadband Wireless Access Working Group, http://ieee802.org/16, Nov. 8, 2006, pp. 6.

"Part 16: Air Interface for Fixed and Mobile Broadband Wireless Access Systems Improved Coexistence Mechanisms for License-Exempt Operation", Draft Amendment to IEEE Standard for Local and metropolitan area networks, LAN MAN Standards Committee, IEEE Computer Society, IEEE Microwave Theory and Techniques Society, IEEE P802. 16h/D1, Oct. 2006, i-xvi, 1-185.

* cited by examiner

*Primary Examiner* — Keith T Ferguson
(74) *Attorney, Agent, or Firm* — Lisa K. Jorgenson; William J. Kubida

(57) ABSTRACT

A subframe structure for a wireless community uses a master common subframe and second master common subframe method to give BSs different priorities to serve overlapping areas in common subframes. The subframe structure and corresponding method can increase overlapping cells' capacity and reduce interference.

16 Claims, 12 Drawing Sheets

PRIORITIZED COMMON SUBFRAME TO PROVIDE BETTER SERVICE TO THE OVERLAPPING AREAS IN A COMMUNITY

RELATED APPLICATION

The present application claims the benefit of U.S. Provisional Patent Application No. 60/891,122 filed on Feb. 22, 2007, which is hereby incorporated in its entirety by reference for all purposes as if fully set forth herein.

BACKGROUND OF THE INVENTION

The present invention relates to wireless networks and, more specifically, to a method for addressing and minimizing interference due to overlapping wireless systems.

The 802.16h draft standard suggests two kinds of subframe structures which allocate for each system a period of time during which it is guaranteed interference free operation. During this interval, called the master system, no other system (slave system) is allowed to interfere. However, the other systems are allowed to operate in areas where they do not cause interference to the master system, thus improving the capacity of those slave systems, which would otherwise have to be totally silent.

FIG. 1 shows the interference due to overlapping systems when all the three systems have the same working channel. Three base stations S1, S2, and S3 are shown in FIG. 1. Single coverage areas include X corresponding to base station S1, Y corresponding to base station S2, and Z corresponding to base station S3. Dual coverage areas include A corresponding to base stations S1 and S2, B corresponding to base stations S1 and S3, and C corresponding to base stations S2 and S3. A triple coverage area D corresponds to all three base stations S1, S2, and S3.

FIG. 2 describes a first subframe structure of the community containing these three overlapping systems shown in FIG. 1. FIG. 2 shows a common subframe that is part of the MAC Frame when all the systems of a coexistence community may operate in parallel. The operation during these subframes may require limitations of the transmit power. FIG. 2 also shows a master subframe that is part of the MAC frame used by a specific system (master system) of a coexistence community to operate with reduced interference from its neighboring systems. FIG. 2 also shows a slave subframe that is part of the MAC frame coinciding with the master subframe in which all systems (other than the master) of the coexistence community have restricted operation.

FIG. 3 shows an alternative subframe structure of the community containing the three overlapping systems. The difference between FIGS. 2 and 3 is that in FIG. 2 each frame includes a master subframe of each cell in a community operating in the same working channel, whereas in FIG. 3 each frame includes a master subframe of only one cell in a community operating in the same working channel. This means that in FIG. 3 three frames are required to provide master subframes of the cells in a community with three cells operating in the same working channel. Both of the subframe structures of FIGS. 2 and 3 are known to those skilled in the art.

In a common subframe, the Base Station ("BS") provides service to the Subscriber Station(s) ("SSs") located in a non-overlapping area. In a master subframe, the BS has priority over the other systems which means it can service all the SSs associated with it. In a slave subframe, the BS should not interfere with the BS in a master state, which means it can provide service to the SSs in the non-overlapping area. FIG. 4 illustrates the regions being served during the various subframes when the subframe structure of FIG. 3 is used.

Note that in FIG. 4, Region X, which is served by base station S1, without any interference from base station S2 and S3, is served during all the subframes. An SS located in that region is served during the common frames as well as during the subframes in which S1 is either a slave or a master. Similarly, SSs located in regions Y and Z are also served by either S2 or S3 during all the subframes, as can be seen in FIG. 4.

On the other hand, S1 SSs located in region A suffer from interference from base station S2, consequently they are not served during the common subframes but only when S1 is the master. When S2 is the master, it serves all its SSs located in region A. When S3 is the master, area A can not be served by either S1 or S2 since no priority is allocated to either of them. Similarly, SSs in areas B and C should be served only during the master subframes of their corresponding system. In a common subframe, SSs in areas A, B, C, and D can not be served by any BS since no priority is allocated to any BS.

A slave hierarchy method has been proposed to give SSs in overlapping areas more chance to be served. The idea behind the method is to define a certain slave hierarchy. For example, after being the master a system becomes a "secondary master" and still has priority over all other systems in the neighborhood except the new master. Thus in the second subframe, base station S2 is the master, but base station S1 is now the "secondary master" and has priority over base station S3, in the third subframe, base station S3 becomes the master, while base station S2, the "secondary master," has priority over base station S1. In the fourth subframe, again base station S1 is the master, while base station S3 is the second master.

Accordingly, a first new subframe structure is defined in FIG. 5 and a second new subframe structure is defined in FIG. 6. FIG. 5 shows a subframe structure with slave hierarchy including a common frame, master, secondary master, and slave for each of base stations S1, S2, and S3. FIG. 6 shows a subframe structure with slave hierarchy including a common frame/master, common frame/secondary master, and common frame/slave for each of base stations S1, S2, and S3. The difference between FIGS. 5 and 6 is that in FIG. 5 each frame includes a master subframe and secondary master of each cell in a community operating in the same working channel, whereas in FIG. 6 each frame includes a master subframe of only one cell and a secondary master subframe in a community operating in the same working channel. This means that in FIG. 6, three frames are required to provide master subframes of the cells and secondary master subframes in a community with three cells operating in the same working channel.

FIG. 7 shows the regions being served during the various subframes when the subframe structure of FIG. 6 with slave hierarchy is used.

As shown in FIG. 7, during the $3^{rd}$ subframe base station S2 is the secondary master and has priority over base station S1, and the SSs in area A can be served. Similarly, S1 SSs in area B can be served during the second subframe and S3 SSs in area C can be served during the first subframe.

After this optimization, SSs in areas A, B, C, and D still can not be served by any BS since no priority is allocated to any BS in a common subframe. What is desired, therefore, is a further optimization to address this problem of the prior art.

SUMMARY OF THE INVENTION

According to the present invention, a subframe structure with slave hierarchy uses a prioritized common subframe to substantially reduce interference and to provide better service in overlapping areas of a wireless community.

The 802.16h draft introduces subframe structure (common subframe, master subframe/slave subframe) to harmonize the frame transmissions of the overlapping BSs working in the same channel (these BSs are defined as a community). The prior art introduces hierarchy slave subframes to make special reuse more efficient. According to the present invention, two common subframe optimizations are set forth to provide even further reduction of interference and greater service in overlapping areas of the wireless community.

According to a first embodiment of the invention, a first subframe structure uses a master/slave common subframe. The BS in the master common subframe has priority over all the other BSs in a community that can communicate with SSs in an overlapping area. But if a BS in the slave common subframe asks the BS in the master common subframe to decrease transmission power or use the slave common subframe, the BS in the master common subframe should follow the indication.

According to a second embodiment of the invention, a second subframe structure uses a second master common subframe. The BS in the second master common subframe has priority over all other systems except the BS in the master common subframe. The BS in the second master common subframe can service the area that is overlapping with the BS in the slave common subframe. But if a BS in the slave common subframe asks the BS in the second master common subframe to decrease transmission power or go to the slave common subframe, the BS in the second master common subframe should follow the indication.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

DETAILED DESCRIPTION OF THE INVENTION

An optimized subframe structure for a wireless community according to a first embodiment of the invention using a master/slave common subframe (M-C-subframe/S-C-subframe) is described below with reference to FIGS. 8-10.

In order to allow a system to serve SSs in overlapping areas in common subframes, a common subframe priority is provided according to a first embodiment of the invention: master common subframe (M-C-subframe) and slave common subframe (S-C-subframe). In the M-C-subframe, the BS has the master role which may use its maximum capable and allowed operating Equivalent Isotropically Radiated Power ("EIRP") to serve all SSs associated with it if no other BS is interfered with by the BS in the M-C-subframe. If the BS in the M-C-subframe receives requests from its neighbor BSs to ask it to decrease its transmission power or use the S-C-subframe, it should follow the request.

In the S-C-subframe, the BS has the slave role to service the non-overlapping area. If a BS in the S-C-subframe detects interference from the BS in the M-C-subframe, it may request the BS in the M-C-subframe to decrease the transmission power until the BS in the M-C-subframe does not interfere with it. Or this BS may request the BS in the M-C-subframe to use the S-C-subframe.

Figure 1:
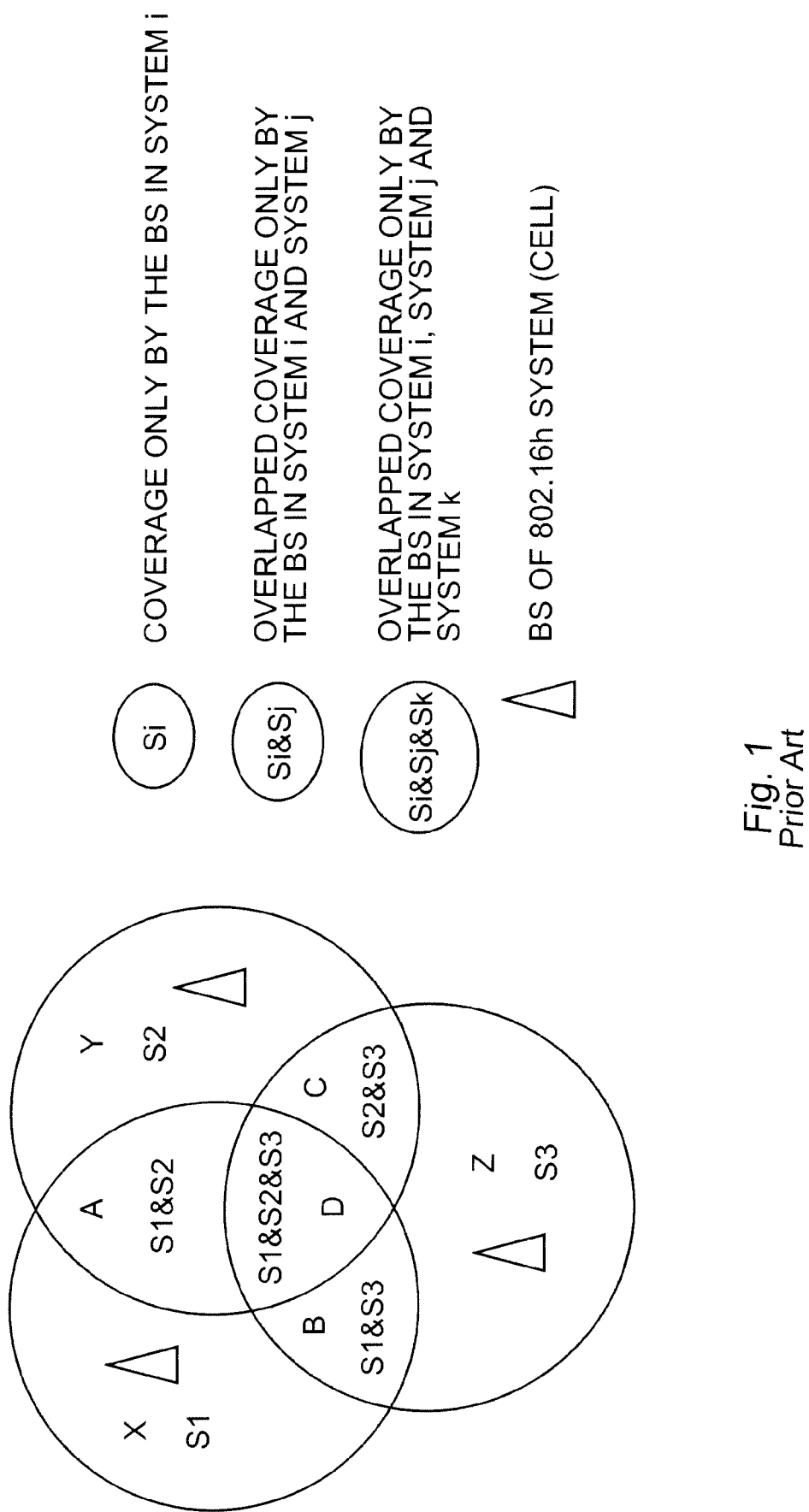
FIG. 1 is a diagram showing interference due to overlapping wireless systems.
Figure 2:
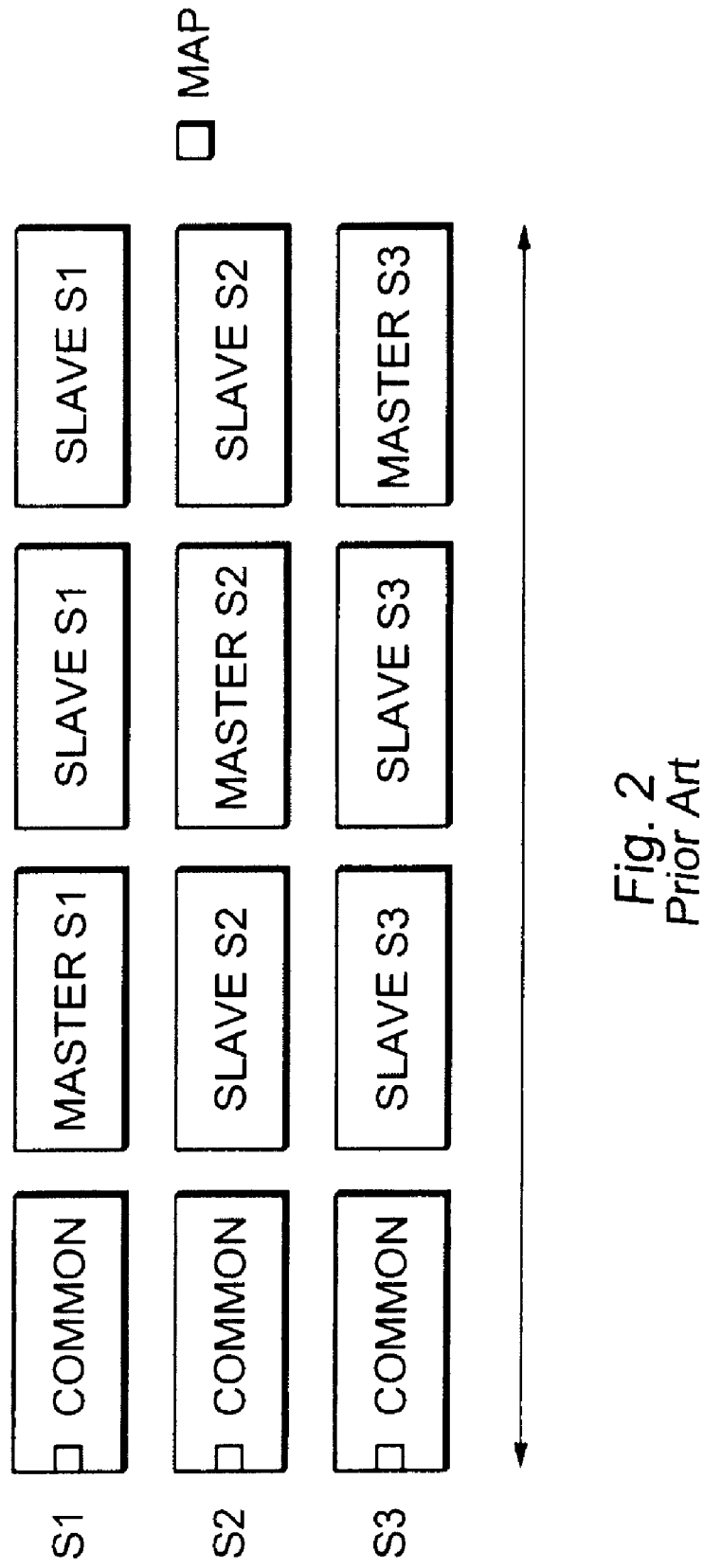
FIG. 2 shows a first subframe structure according to the prior art.
Figure 3:
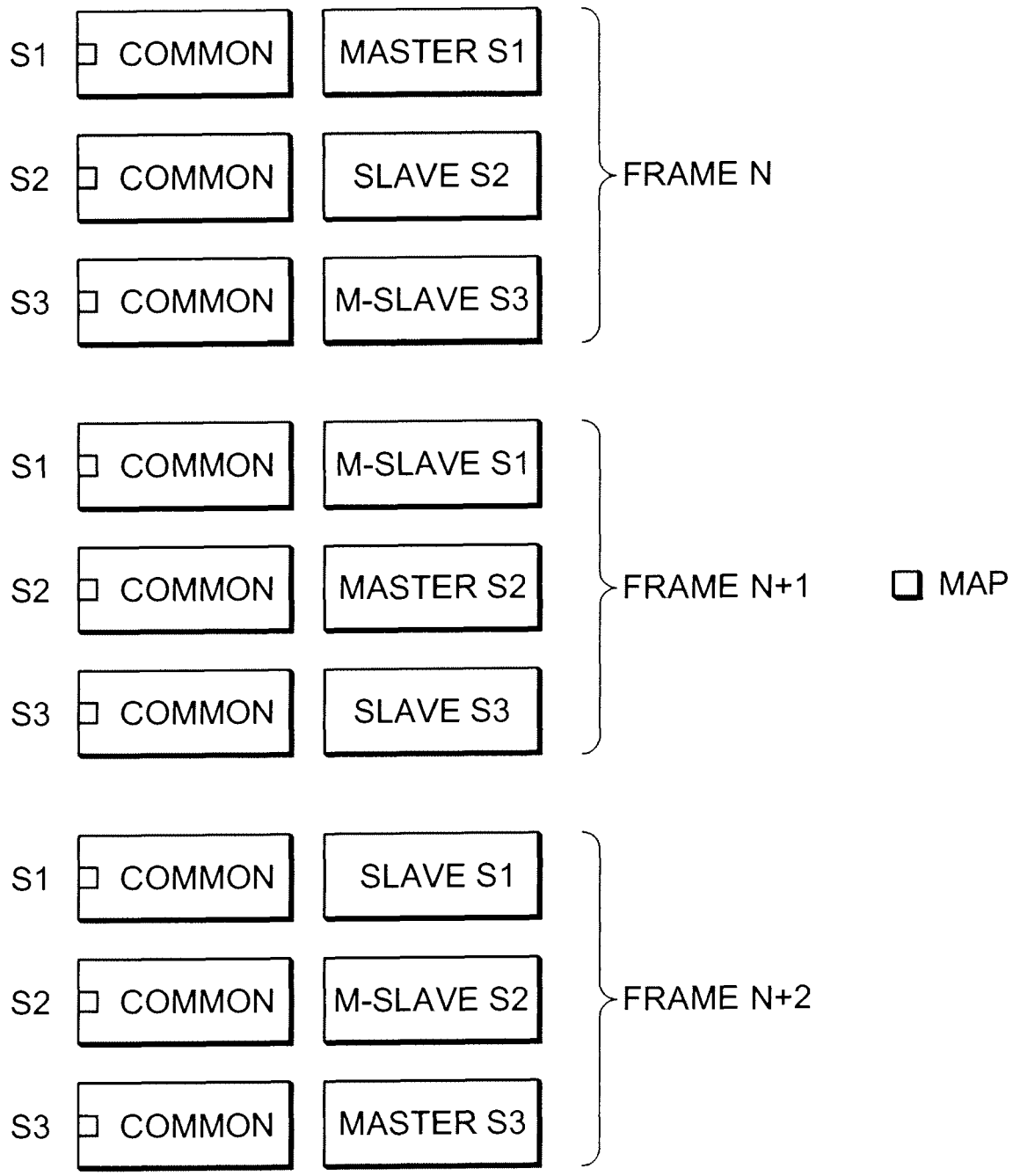
FIG. 3 shows a second subframe structure according to the prior art.
Figure 4:
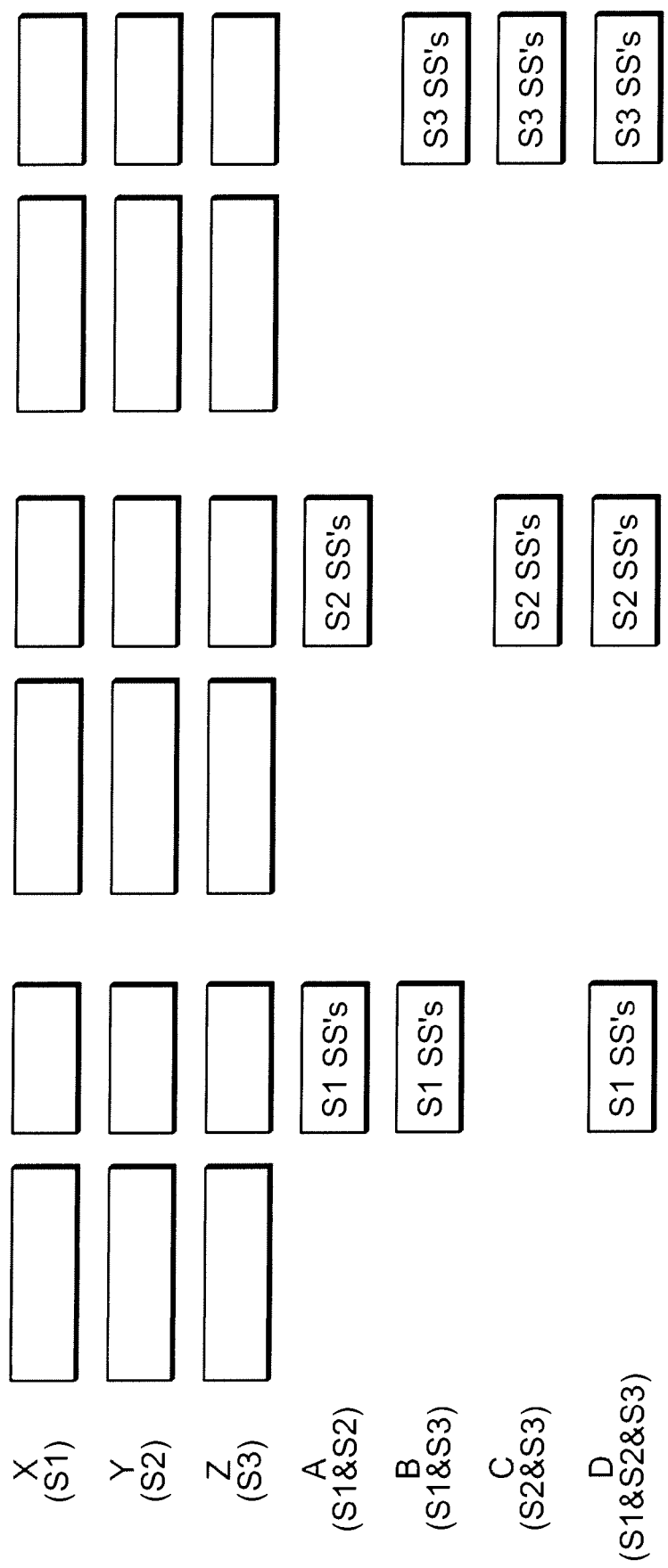
FIG. 4 shows regions being served during the various subframes using the subframe structure of FIG. 3.
Figure 5:
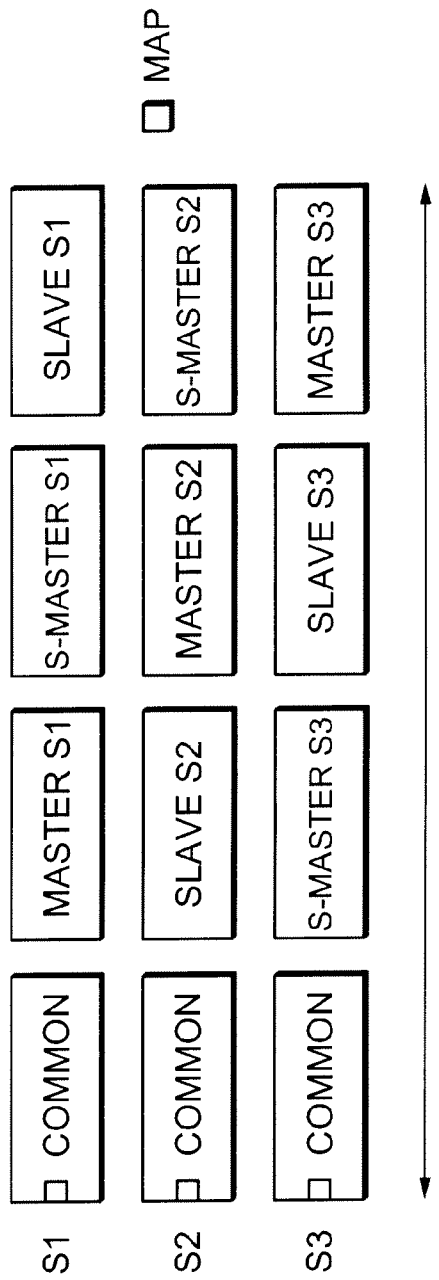
FIG. 5 shows a first subframe structure with slave hierarchy according to the prior art.
Figure 6:
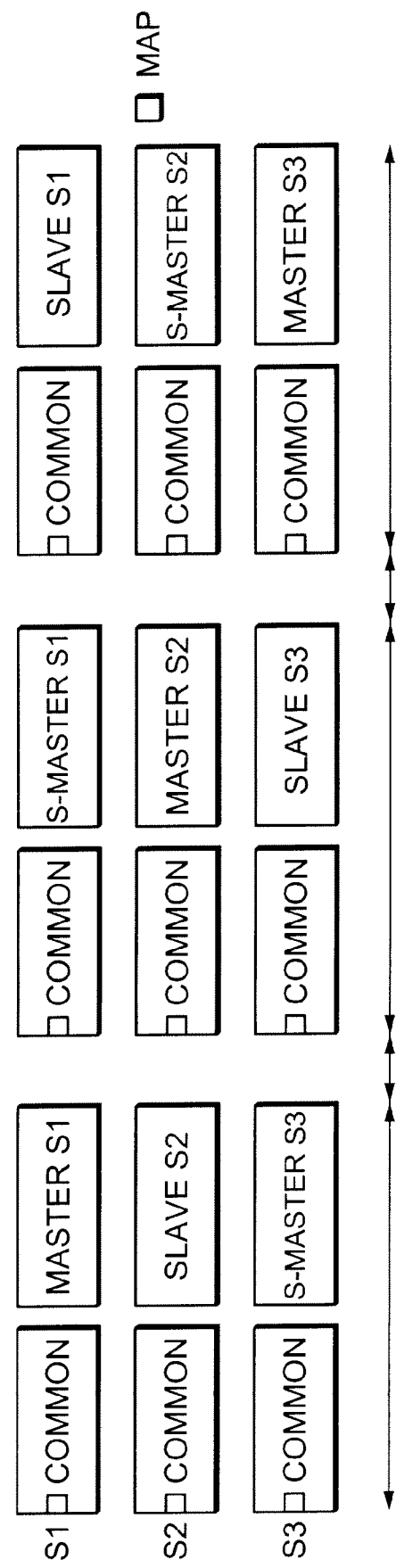
FIG. 6 shows a second subframe structure with slave hierarchy according to the prior art.
Figure 7:
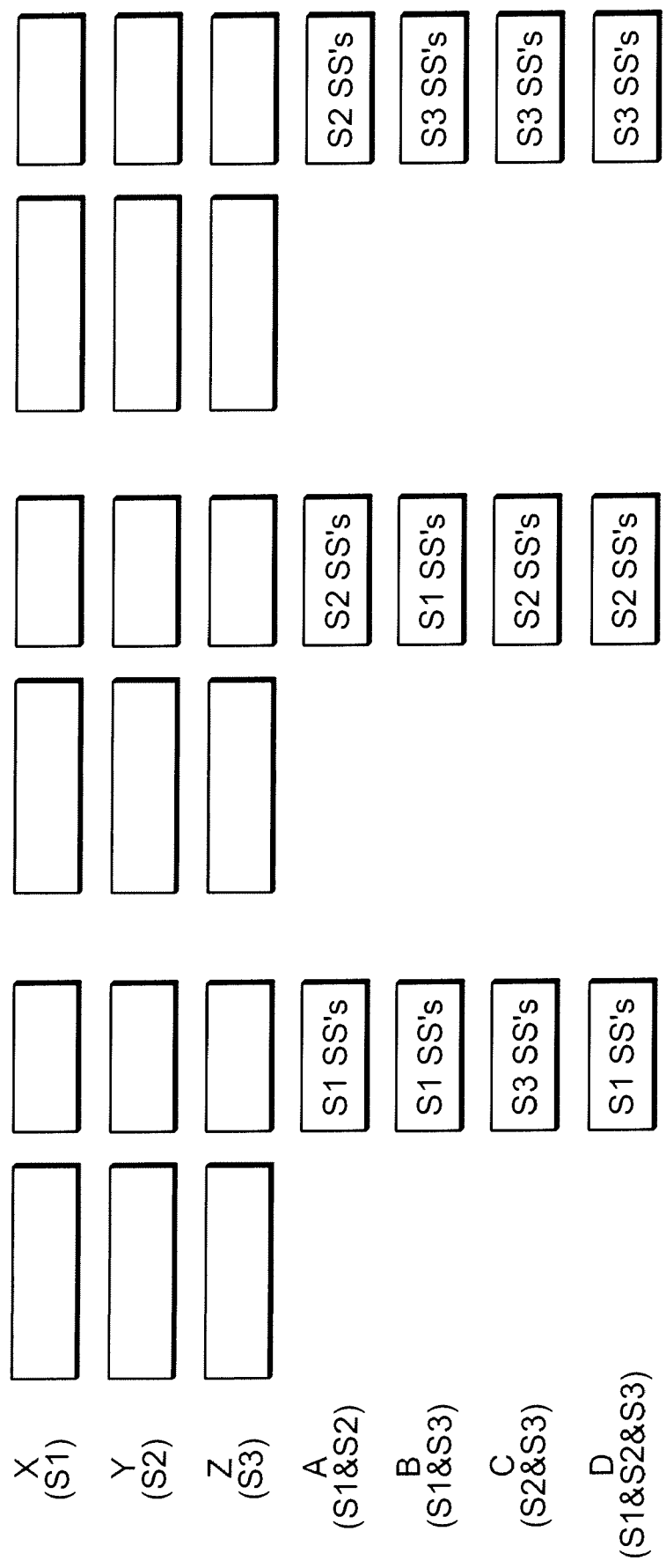
FIG. 7 shows regions being served during the various subframes using the subframe structure of FIG. 6 with slave hierarchy.
Figure 8:
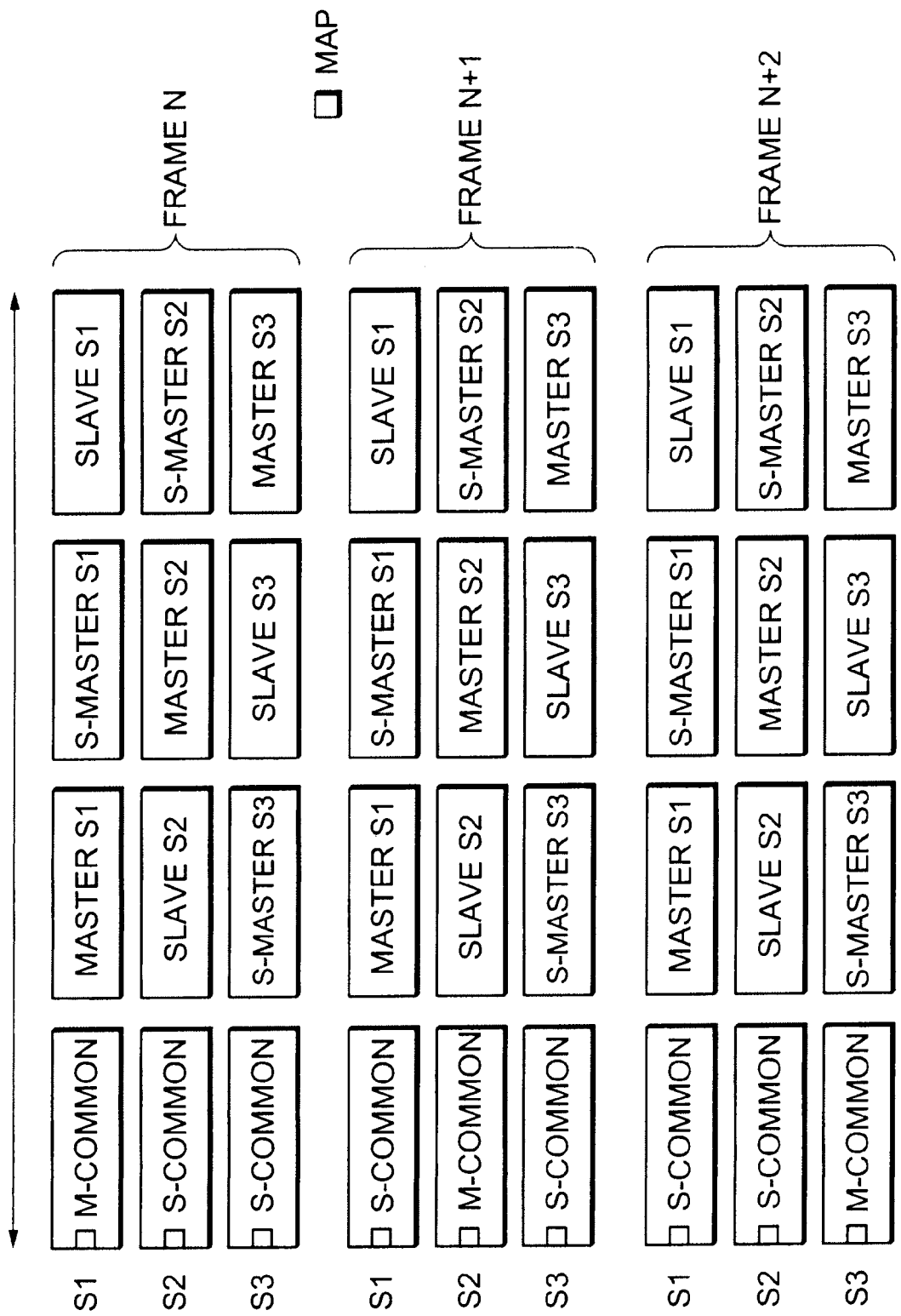
FIG. 8 shows a first subframe structure with master/slave common frame optimization according to the present invention.
Figure 9:
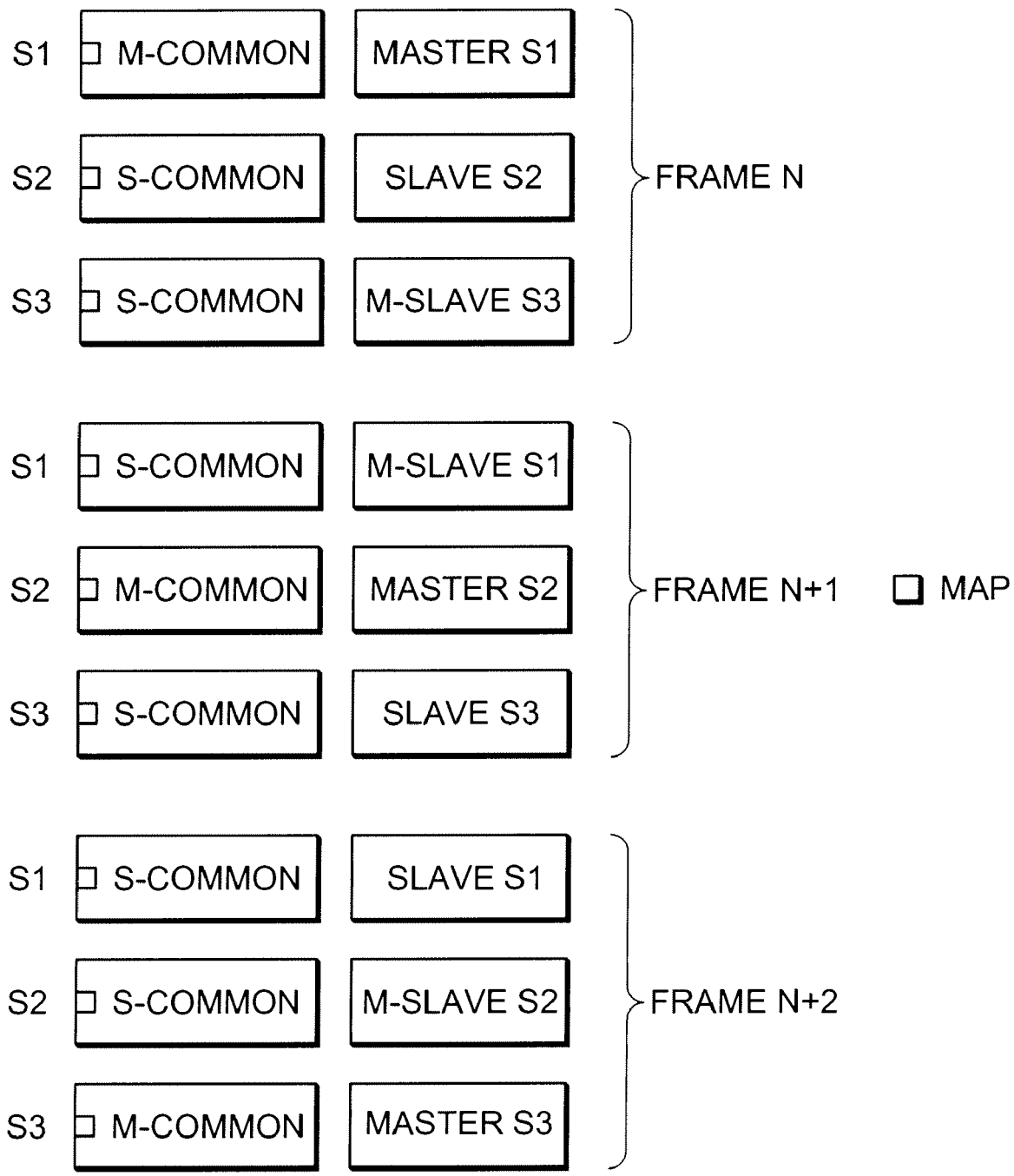
FIG. 9 shows a second subframe structure with master/slave common frame optimization according to the present invention.

After this optimization, subframe structure 1 is shown in FIG. 8 and subframe structure 2 is shown in FIG. 9.

FIG. 8 shows a first subframe structure with master/slave common frame optimization according to the first embodiment of the invention. In a first frame N base station S1 includes, in order, a master common subframe, a master subframe, a secondary master subframe, and a slave subframe. Base station S2 includes, in order, a slave common subframe, a slave subframe, a master subframe, and a secondary master subframe. Base station S3 includes, in order, a slave common subframe, a secondary master subframe, a slave subframe, and a master subframe. In a second frame N+1, base station S1 includes, in order, a slave common subframe, a master subframe, a secondary master subframe, and a slave subframe. Base station S2 includes, in order, a master common subframe, a slave subframe, a master subframe, and a secondary master subframe. Base station S3 includes, in order, a slave common subframe, a secondary master subframe, a slave subframe, and a master subframe. In a third frame N+2, base station S1 includes, in order, a slave common subframe, a master subframe, a secondary master subframe, and a slave subframe. Base station S2 includes, in order, a slave common subframe, a slave subframe, a master subframe, and a secondary master subframe. Base station S3 includes, in order, a master common subframe, a secondary master subframe, a slave subframe, and a master subframe.

FIG. 9 shows a second subframe structure with master/slave common frame optimization according to the first embodiment of the present invention. In frame N, base station S1 includes a master common subframe and a master subframe, base station S2 includes a slave common subframe and a slave subframe, and base station S3 includes a slave common subframe and secondary master subframe. In frame N+1, base station S1 includes a slave common subframe and a secondary master subframe, base station S2 includes a master common subframe and a master subframe, and base station S3 includes a slave common subframe and slave subframe. In frame N+2, base station S1 includes a slave common subframe and a slave subframe, base station S2 includes a slave common subframe and a secondary master subframe, and base station S3 includes a master common subframe and master subframe.

Figure 10:
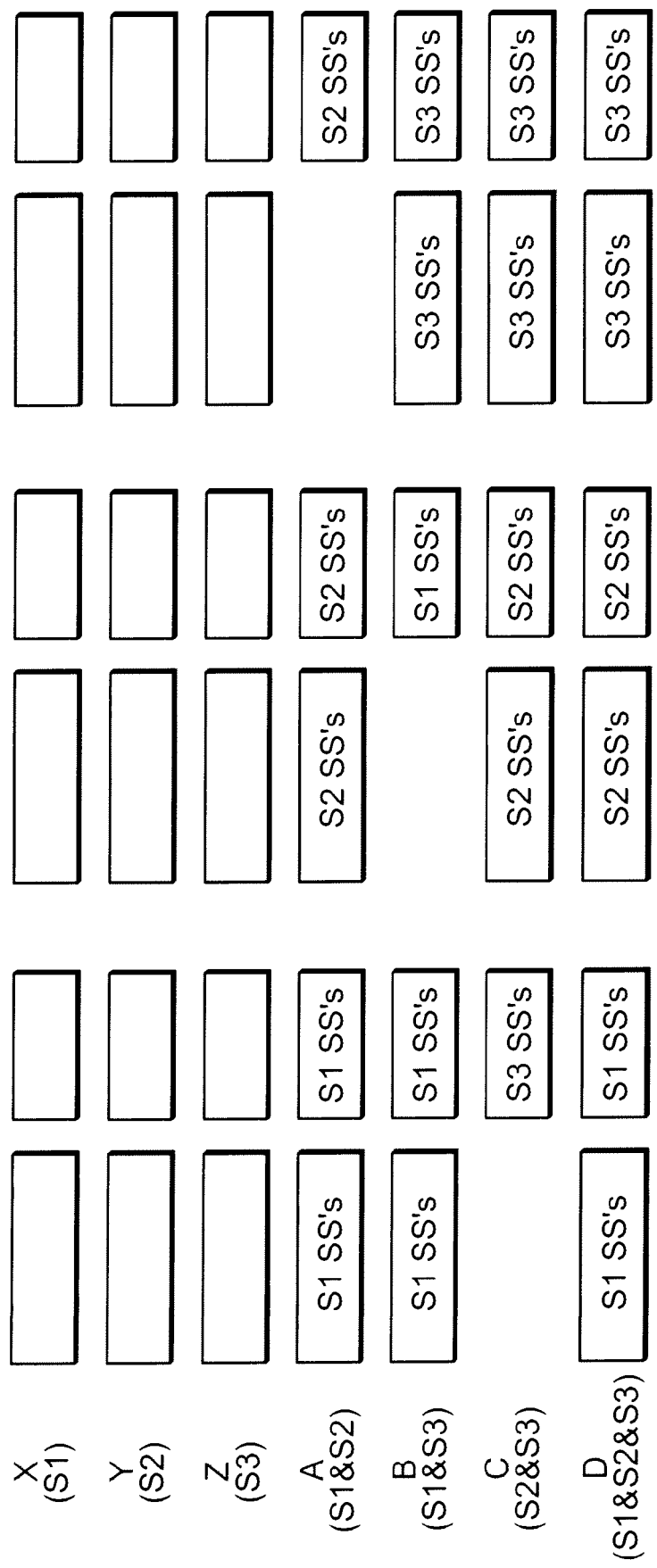
FIG. 10 shows regions being served during the various subframes using the subframe structure of FIG. 9 with a master common frame.

FIG. 10 shows the regions being served during the various subframes when the second subframe structure of FIG. 9 with the master common subframe is used.

After the first optimization scheme described above, there are still some areas that can not be served by any BS in the common subframe. When S3 is in the master common subframe, area A can not be served by either S1 or S2 since no priority is allocated to either of them. When S1 is in the master common subframe, area C can not be served by either S2 or S3 since no priority is allocated to either of them. Similarly, when S2 is in the master common subframe, area B can not be served by either S1 or S3 since no priority is allocated to either of them.

An optimized subframe structure for a wireless community according to a second embodiment of the invention using a slave hierarchy common subframe is described below with reference to FIGS. 11-13.

A hierarchy method according to the second embodiment of the invention uses a slave common subframe to give SSs in overlapping areas more chance to be served. The method of the second embodiment of the invention defines a certain slave hierarchy. For example, after having the master common subframe a system has a "second master" common subframe (S-M-C-subframe) and still has priority over the other systems in the neighborhood except the system having the new master common subframe (M-C-subframe).

If a BS using the S-M-C-subframe receives requests from its neighbor BS to ask it to decrease its transmit power or use the slave common subframe (S-C-subframe), it should follow these requests.

Figure 11:
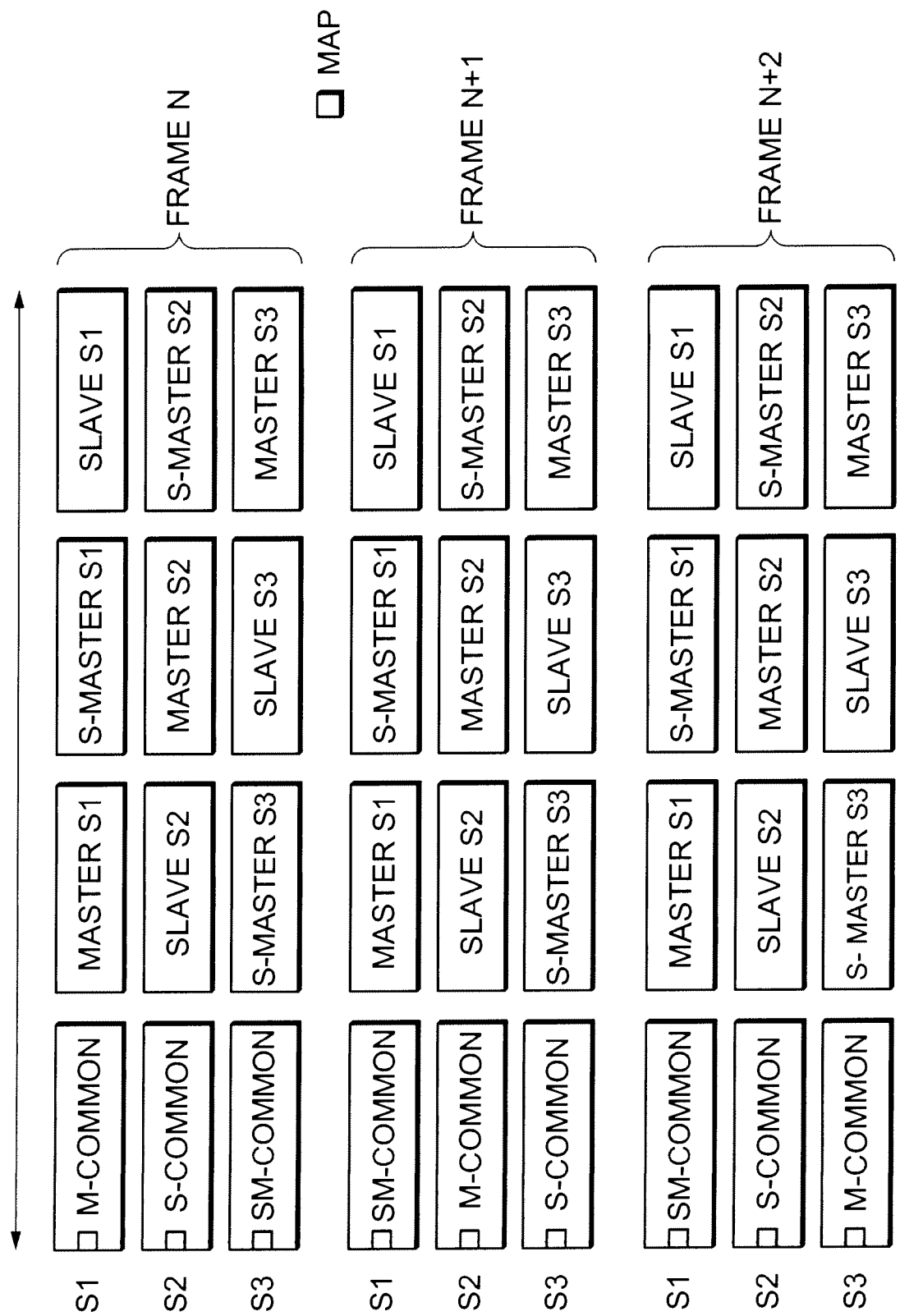
FIG. 11 shows a first subframe structure with master/second master common frame optimization according to the present invention.

FIG. 11 shows the first subframe structure with master/second master common frame optimization according to the second embodiment of the invention. In a first frame N, base station S1 includes, in order, a master common subframe, a master subframe, a secondary master subframe, and a slave subframe. Base station S2 includes, in order, a slave common subframe, a slave subframe, a master subframe, and a secondary master subframe. Base station S3 includes, in order, a secondary master common subframe, a secondary master subframe, a slave subframe, and a master subframe. In a second frame N+1, base station S1 includes, in order, a secondary master common subframe, a master subframe, a secondary master subframe, and a slave subframe. Base station S2 includes, in order, a master common subframe, a slave subframe, a master subframe, and a secondary master subframe. Base station S3 includes, in order, a slave common subframe, a secondary master subframe, a slave subframe, and a master subframe. In a third frame N+2, base station S1 includes, in order, a slave common subframe, a master subframe, a secondary master subframe, and a slave subframe. Base station S2 includes, in order, a slave common subframe, a slave subframe, a master subframe, and a secondary master subframe. Base station S3 includes, in order, a master common subframe, a secondary master subframe, a slave subframe, and a master subframe.

Figure 12:
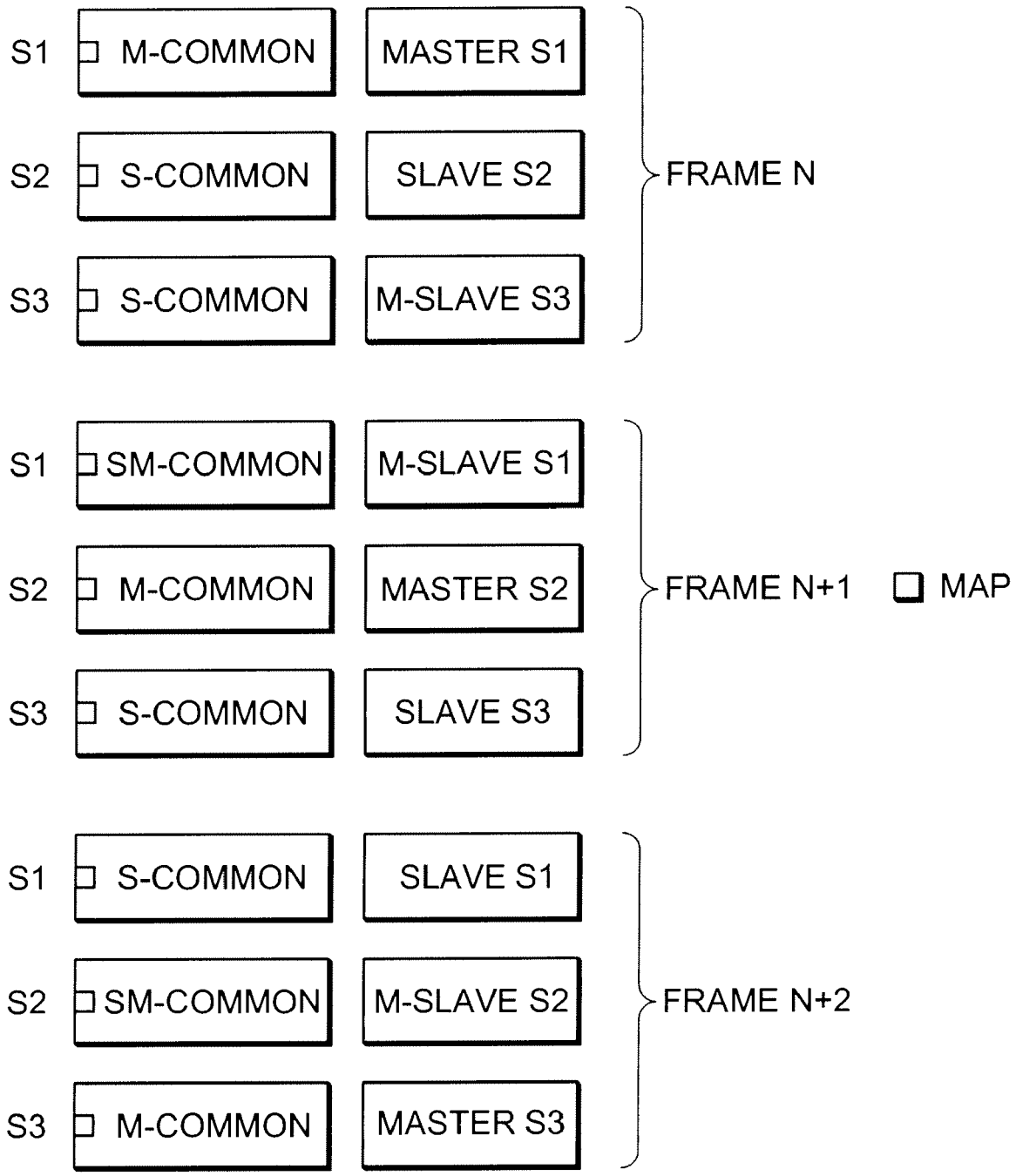
FIG. 12 shows a second subframe structure with master/second master common frame optimization according to the present invention.

FIG. 12 shows a second subframe structure with master/second master common frame optimization according to the second embodiment of the invention. In frame N, base station S1 includes a master common subframe and a master subframe, base station S2 includes a slave common subframe and a slave subframe, and base station S3 includes a secondary master common subframe and secondary master subframe. In frame N+1, base station S1 includes a secondary master common subframe and a secondary master subframe, base station S2 includes a master common subframe and a master subframe, and base station S3 includes a slave common subframe and slave subframe. In frame N+2, base station S1 includes a slave common subframe and a slave subframe, base station S2 includes a secondary master common subframe and a secondary master subframe, and base station S3 includes a master common subframe and master subframe.

Figure 13:
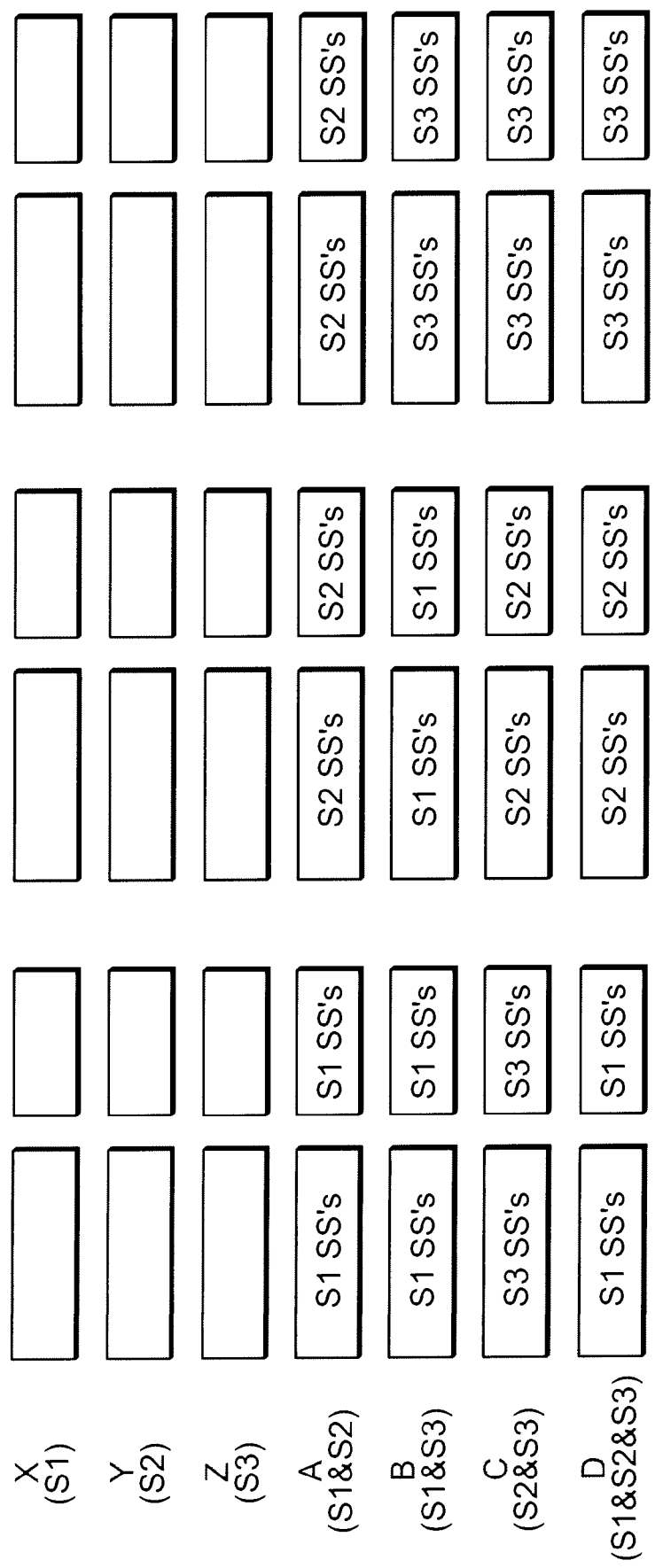
FIG. 13 shows regions being served during the various subframes using the subframe structure of FIG. 12 with a master/second master common frame.

FIG. 13 describes regions being served during the various subframes when the second subframe structure with master/second master common subframe shown in FIG. 12 is used. Note that in FIG. 13, all of the overlapping areas A, B, C, and D, can now be serviced using the subframe structure of the second embodiment of the present invention and none are blocked. Thus, the subframe structure of the second embodiment of the present invention greatly improves services in the overlapping areas and reduces interference.

Glossary

Subscriber Station (SS): A generalized equipment set providing connectivity between subscriber equipment and a base station (BS).

Frame: A structured data sequence of fixed duration used by some PHY (Physical Layer Specification) specifications. A frame may contain both an uplink subframe and a downlink subframe. The downlink subframe is used for transmitting data from a BS (base station) to its associated SSs. The uplink subframe is used for transmitting data from SSs to the BS with which they associate.

Common subframe: That part of the MAC (Media Access Control) frame when all the systems of a coexistence community may operate in parallel. The operation during these subframes may require limitations of the transmit power.

Master subframe: That part of the MAC frame which is used by a specific system (master system) of a coexistence community to operate with reduced interference from its neighboring systems.

Slave subframe: That part of the MAC frame coinciding with the master subframe in which all systems (other than the master) of the coexistence community have restricted operation.

MAP: A set of information that defines the entire access for a scheduling interval. There are two kinds of MAPs: downlink map (DL-MAP) and uplink map (UL-MAP).

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

I claim:

1. A wireless community using a subframe structure comprising a master and slave common subframe, wherein a base station in the master common subframe has priority over all of the other base stations in the wireless community that can communicate with subscriber stations in an overlapping area, and wherein if a base station in a slave common subframe asks a base station in the master common subframe to decrease transmission power, the base station in the master common subframe should follow the indication.

2. The wireless community of claim 1 wherein the subframe structure further comprises a master subframe, a secondary master subframe, and a slave subframe.

3. The wireless community of claim 1 wherein the subframe structure further comprises a master subframe, a secondary master subframe, and a slave subframe.

4. A method for improving the service and reducing interference in a wireless community comprising using a common subframe including a master common subframe and a slave common subframe, wherein a base station in the master common subframe has priority over all of the other base stations in the wireless community that can communicate with subscriber stations in an overlapping area, and wherein if a base station in a slave common subframe asks a base station in the master common subframe to decrease transmission power, the base station in the master common subframe should follow the indication.

5. The method of claim 4 further comprising the use of a master subframe, a secondary master subframe, and a slave subframe.

6. A wireless community using a subframe structure comprising a master common, second master common, and a slave common subframe, wherein a base station in the second master common subframe has priority over all of the other base stations in the wireless community that can communicate with subscriber stations in an overlapping area except for the base station in the master common subframe, and wherein if a base station in a slave common subframe asks a base station in the second master common subframe to decrease transmission power, the base station in the second master common subframe should follow the indication.

7. A method for improving the service and reducing interference in a wireless community comprising using a common subframe including a master common, a second master common, and a slave common subframe, wherein a base station in the second master common subframe has priority over all of the other base stations in the wireless community that can communicate with subscriber stations in an overlapping area except for the base station in the master common subframe, and wherein if a base station in a slave common subframe asks a base station in the second master common subframe to decrease transmission power, the base station in the second master common subframe should follow the indication.

8. The method of claim 7 further comprising the use of a master subframe, a secondary master subframe, and a slave subframe.

9. A wireless community using a subframe structure comprising a master and slave common subframe, wherein a base station in the master common subframe has priority over all of the other base stations in the wireless community that can communicate with subscriber stations in an overlapping area, and wherein if a base station in a slave common subframe asks a base station in the master common subframe to use a slave common subframe, the base station in the master common subframe should follow the indication.

10. The wireless community of claim 9 wherein the subframe structure further comprises a master subframe, a secondary master subframe, and a slave subframe.

11. A method for improving the service and reducing interference in a wireless community comprising using a common subframe including a master common subframe and a slave common subframe, wherein a base station in the master common subframe has priority over all of the other base stations in the wireless community that can communicate with subscriber stations in an overlapping area, and wherein if a base station in a slave common subframe asks a base station in the master common subframe to use a slave common subframe, the base station in the master common subframe should follow the indication.

12. The method of claim 11 further comprising the use of a master subframe, a secondary master subframe, and a slave subframe.

13. A wireless community using a subframe structure comprising a master common, second master common, and a slave common subframe, wherein a base station in the second master common subframe has priority over all of the other base stations in the wireless community that can communicate with subscriber stations in an overlapping area except for the base station in the master common subframe, and wherein if a base station in a slave common subframe asks a base station in the second master common subframe to use a slave common subframe, the base station in the master common subframe should follow the indication.

14. The wireless community of claim 13 wherein the subframe structure further comprises a master subframe, a secondary master subframe, and a slave subframe.

15. A method for improving the service and reducing interference in a wireless community comprising using a common subframe including a master common, a second master common, and a slave common subframe, wherein a base station in the second master common subframe has priority over all of the other base stations in the wireless community that can communicate with subscriber stations in an overlapping area except for the base station in the master common subframe, and wherein if a base station in a slave common subframe asks a base station in the second master common subframe to use a slave common subframe, the base station in the master common subframe should follow the indication.

16. The method of claim 15 further comprising the use of a master subframe, a secondary master subframe, and a slave subframe.

* * * * *